United States Patent
Meshkati et al.

(10) Patent No.: US 9,078,120 B2
(45) Date of Patent: Jul. 7, 2015

(54) METHOD AND APPARATUS FOR DETERMINING MOBILITY PARAMETERS BASED ON NEIGHBORING ACCESS POINTS

(71) Applicant: QUALCOMM Incorporated, San Diego, CA (US)

(72) Inventors: Farhad Meshkati, San Diego, CA (US); Peerapol Tinnakornsrisuphap, San Diego, CA (US); Damanjit Singh, San Diego, CA (US); Yeliz Tokgoz, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 13/779,421

(22) Filed: Feb. 27, 2013

(65) Prior Publication Data

US 2013/0231099 A1 Sep. 5, 2013

Related U.S. Application Data

(60) Provisional application No. 61/606,246, filed on Mar. 2, 2012.

(51) Int. Cl.
*H04M 3/00* (2006.01)
*H04W 8/22* (2009.01)
*H04W 24/02* (2009.01)
*H04W 28/16* (2009.01)
*H04W 84/04* (2009.01)

(52) U.S. Cl.
CPC ............... *H04W 8/22* (2013.01); *H04W 28/16* (2013.01); *H04W 24/02* (2013.01); *H04W 84/045* (2013.01)

(58) Field of Classification Search
CPC ....... H04W 8/22; H04W 28/16; H04W 28/00; H04W 24/02; H04W 24/10; H04W 24/00; H04W 84/045
USPC .............. 455/418, 436, 411, 435.1, 442, 446; 370/338, 252, 331, 332
See application file for complete search history.

(56) References Cited

U.S. PATENT DOCUMENTS

| | | |
|---|---|---|
| 2009/0092096 A1 | 4/2009 | Czaja et al. |
| 2009/0325624 A1* | 12/2009 | Centonza ...................... 455/522 |
| 2010/0029282 A1* | 2/2010 | Stamoulis et al. ............ 455/436 |
| 2010/0261467 A1 | 10/2010 | Chou et al. |
| 2010/0317386 A1* | 12/2010 | Da Silva et al. .............. 455/507 |
| 2011/0205910 A1 | 8/2011 | Soomro et al. |
| 2011/0263260 A1 | 10/2011 | Yavuz et al. |
| 2011/0319088 A1 | 12/2011 | Zhou et al. |
| 2012/0009972 A1 | 1/2012 | Viering et al. |
| 2012/0163229 A1 | 6/2012 | Roy et al. |
| 2013/0252602 A1* | 9/2013 | Meshkati et al. .......... 455/422.1 |
| 2014/0064247 A1* | 3/2014 | Teyeb et al. .................... 370/331 |

OTHER PUBLICATIONS

International Search Report and Written Opinion—PCT/US2013/028745—ISA/EPO—Jul. 8, 2013.

\* cited by examiner

*Primary Examiner* — Khai M Nguyen
(74) *Attorney, Agent, or Firm* — Fariba Yadegar-Bandari

(57) ABSTRACT

Methods and apparatus are provided for configuring mobility or paging parameters of a femto node. A method includes determining capabilities of one or more neighboring access points based in part on signals received from the one or more neighboring access points. The method includes comparing the capabilities to one or more capabilities of the femto node to determine a mobility or paging parameter adjustment. The method includes adjusting one or more mobility or paging parameters based on the mobility or paging parameter adjustment.

32 Claims, 10 Drawing Sheets

METHOD AND APPARATUS FOR DETERMINING MOBILITY PARAMETERS BASED ON NEIGHBORING ACCESS POINTS

CROSS-REFERENCE TO RELATED APPLICATION

The present Application for Patent claims priority to Provisional Application No. 61/606,246, filed Mar. 2, 2012, entitled "METHOD AND APPARATUS FOR DETERMINING MOBILITY PARAMETERS BASED ON NEIGHBORING ACCESS POINTS", which is assigned to the assignee hereof, and is hereby expressly incorporated in its entirety by reference herein.

FIELD

Aspects of the present disclosure relate to wireless communication systems, and more particularly to adjusting mobility or paging parameters based on neighboring access points.

BACKGROUND

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

SUMMARY

Methods and apparatus for configuring mobility or paging parameters of a femto node are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method for configuring mobility or paging parameters of a femto node includes determining capabilities of one or more neighboring access points based in part on signals received from the one or more neighboring access points. The method includes comparing the capabilities to one or more capabilities of the femto node to determine a mobility or paging parameter adjustment. The method includes adjusting one or more mobility or paging parameters based on the mobility or paging parameter adjustment.

In another aspect, an apparatus for configuring mobility or paging parameters of a femto node includes at least one processor configured to determine capabilities of one or more neighboring access points based in part on signals received from the one or more neighboring access points, compare the capabilities to one or more capabilities of the femto node to determine a mobility or paging parameter adjustment, and adjust one or more mobility or paging parameters based on the mobility or paging parameter adjustment. The apparatus includes a memory coupled to the at least one processor.

In another aspect, an apparatus for configuring mobility or paging parameters of a femto node includes means for determining capabilities of one or more neighboring access points based in part on signals received from the one or more neighboring access points. The apparatus includes means for comparing the capabilities to one or more capabilities of a femto node to determine a mobility or paging parameter adjustment. The apparatus includes means for adjusting one or more mobility or paging parameters based on the mobility or paging parameter adjustment.

In another aspect, a computer program product for configuring mobility or paging parameters of a femto node includes a computer-readable medium including code for causing at least one computer to determine capabilities of one or more neighboring access points based in part on signals received from the one or more neighboring access points, code for causing the at least one computer to compare the capabilities to one or more capabilities of the femto node to determine a mobility or paging parameter adjustment, and code for causing the at least one computer to adjust one or more mobility or paging parameters based on the mobility or paging parameter adjustment.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
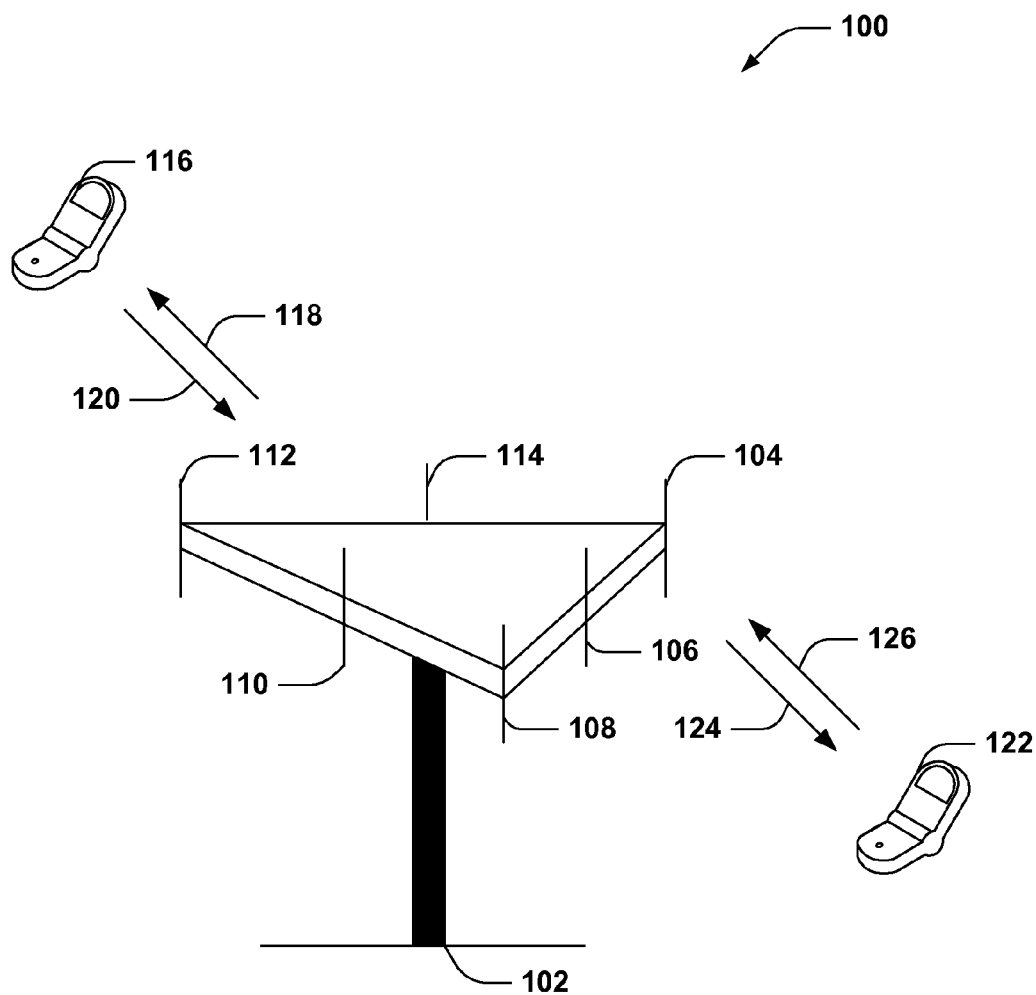
FIG. 1 is a block diagram of an example wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted. According to an example, system 100 can be a multiple-input multiple-output (MIMO) communication system.

Figure 2:
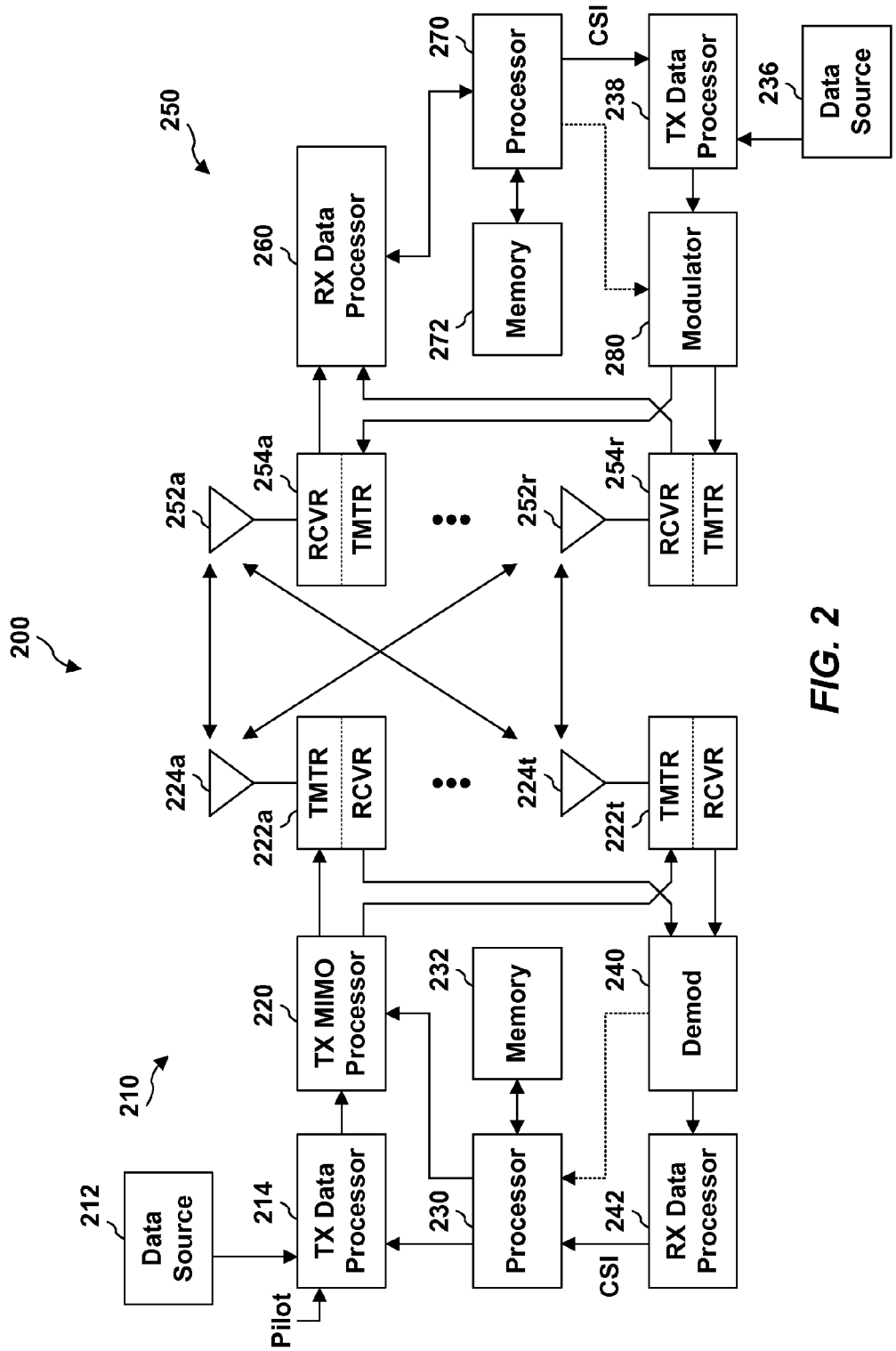
FIG. 2 is an illustration of an example wireless network environment that can be employed in conjunction with the various systems and methods described herein.

FIG. 2 shows an example wireless communication system 200. The wireless communication system 200 depicts one base station 210, which can include a femto node, and one mobile device 250 for sake of brevity. However, it is to be appreciated that system 200 can include more than one base station and/or more than one mobile device, wherein additional base stations and/or mobile devices can be substantially similar or different from example base station 210 and mobile device 250 described below. In addition, it is to be appreciated that base station 210 and/or mobile device 250 can employ the systems (FIGS. 6, 7, and 8) and/or methods (FIGS. 9 and 10) described herein to facilitate wireless communication there between. For example, components or functions of the systems and/or methods described herein can be part of a memory 232 and/or 272 or processors 230 and/or 270 described below, and/or can be executed by processors 230 and/or 270 to perform the disclosed functions.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At mobile device 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by antennas 224, conditioned by receivers 222, demodulated by a demodulator 240, and processed by a RX data processor 242 to extract the reverse link message transmitted by mobile device 250. Further, processor 230 can process the extracted message to determine which precoding matrix to use for determining the beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform functionalities described herein to support adjusting mobility or paging parameters of one or more femto nodes.

Figure 3:
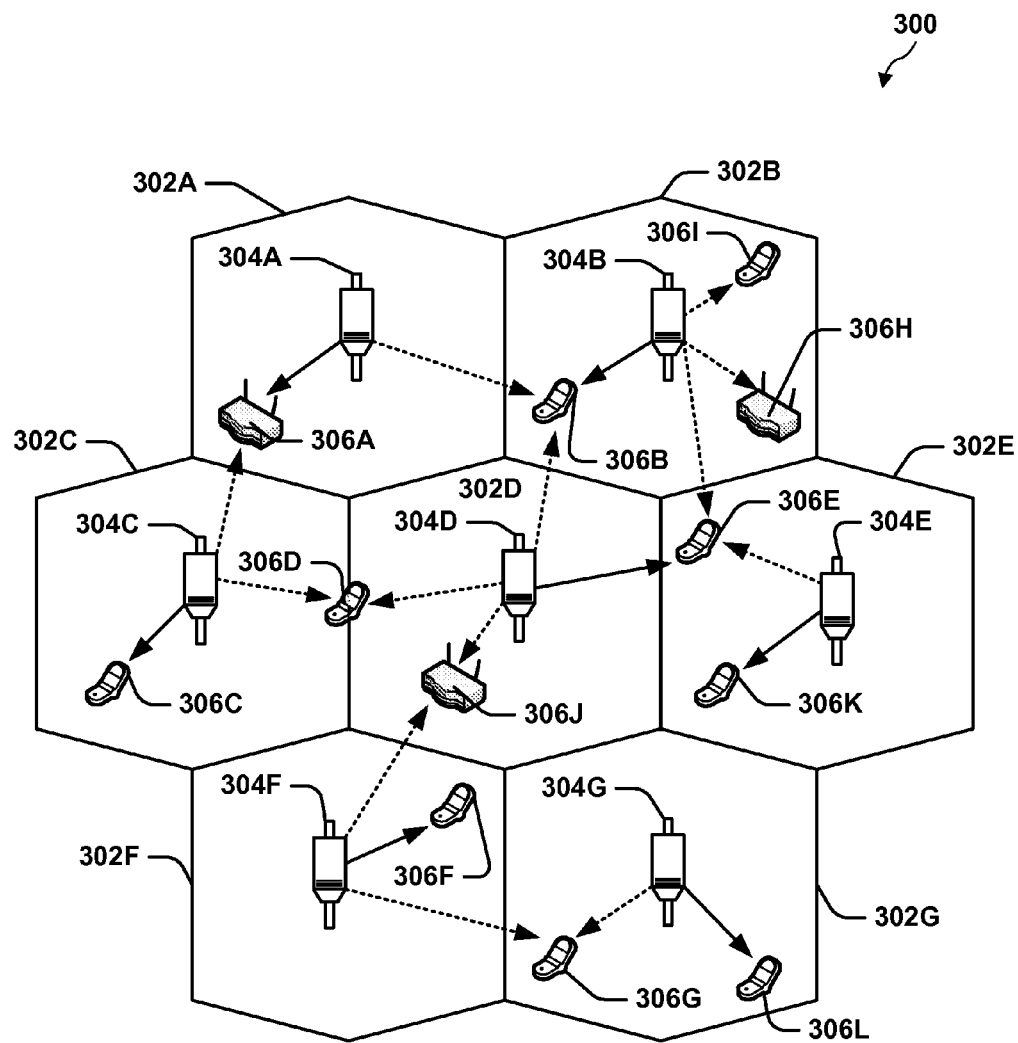
FIG. 3 illustrates an example wireless communication system, configured to support a number of devices, in which the aspects herein can be implemented.

FIG. 3 illustrates a wireless communication system 300, configured to support a number of users, in which the teachings herein may be implemented. The system 300 provides communication for multiple cells 302, such as, for example, macro cells 302A-302G, with each cell being serviced by a corresponding access node 304 (e.g., access nodes 304A-304G). As shown in FIG. 3, access terminals 306 (e.g., access terminals 306A-306L) can be dispersed at various locations throughout the system over time. Each access terminal 306 can communicate with one or more access nodes 304 on a forward link (FL) and/or a reverse link (RL) at a given moment, depending upon whether the access terminal 306 is active and whether it is in soft handoff, for example. The wireless communication system 300 can provide service over a large geographic region.

Figure 4:
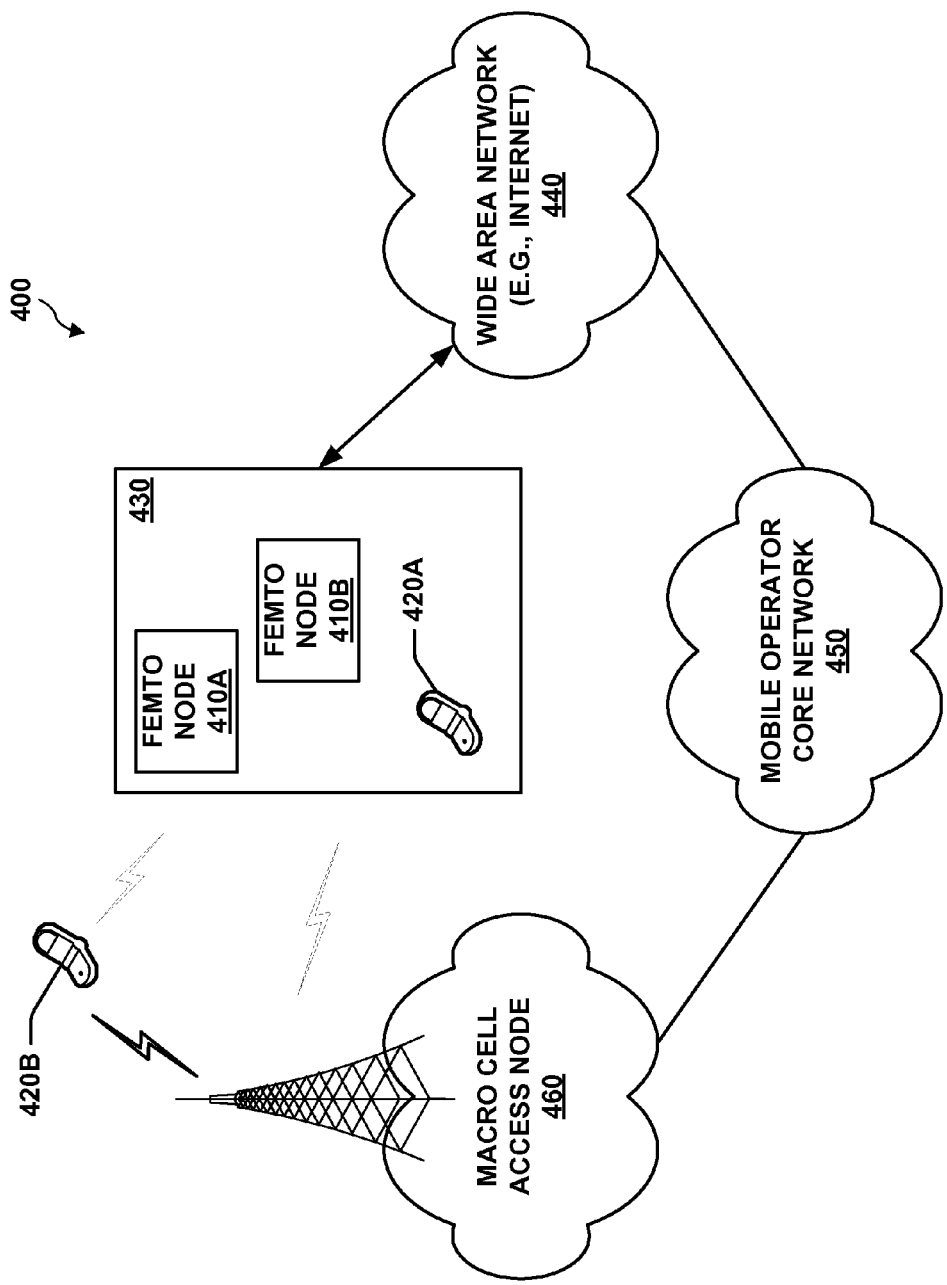
FIG. 4 is an illustration of an exemplary communication system to enable deployment of femto nodes within a network environment.

FIG. 4 illustrates an exemplary communication system 400 where one or more femto nodes are deployed within a network environment. Specifically, the system 400 includes multiple femto nodes 410A and 410B (e.g., femtocell nodes or H(e)NB) installed in a relatively small scale network environment (e.g., in one or more user residences 430). Each femto node 410 can be coupled to a wide area network 440 (e.g., the Internet) and a mobile operator core network 450 via a digital subscriber line (DSL) router, a cable modem, a wireless link, or other connectivity means (not shown). As will be discussed below, each femto node 410 can be configured to serve associated access terminals 420 (e.g., access terminal 420A) and, optionally, alien access terminals 420 (e.g., access terminal 420B). In other words, access to femto nodes 410 can be restricted such that a given access terminal 420 can be served by a set of designated (e.g., home) femto node(s) 410 but may not be served by any non-designated femto nodes 410 (e.g., a neighbor's femto node).

Figure 5:
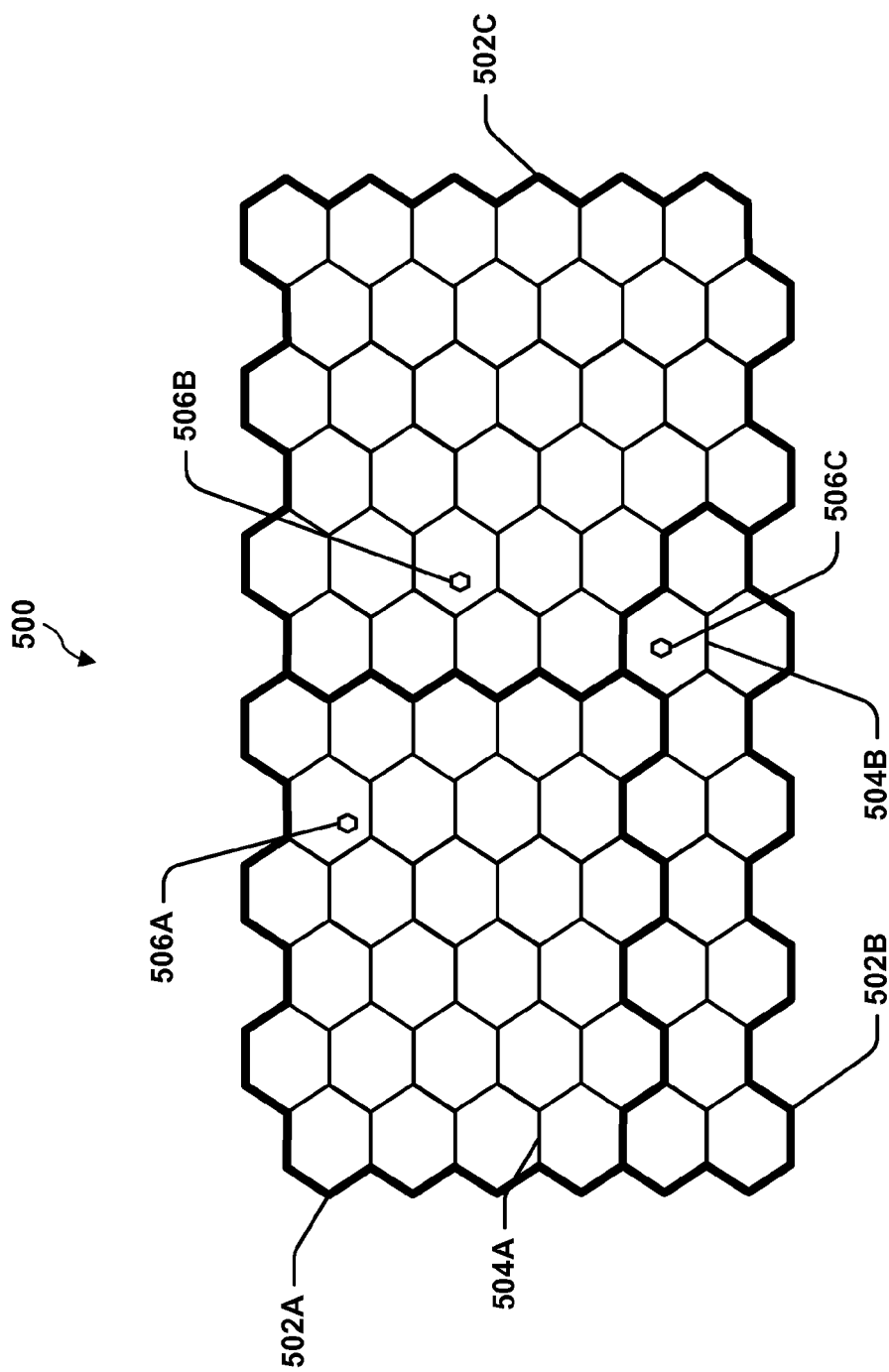
FIG. 5 illustrates an example of a coverage map having several defined tracking areas.

FIG. 5 illustrates an example of a coverage map 500 where several tracking areas 502 (or routing areas or location areas) are defined, each of which includes several macro coverage areas 504. Here, areas of coverage associated with tracking areas 502A, 502B, and 502C are delineated by the wide lines and the macro coverage areas 504 are represented by the hexagons. The tracking areas 502 also include femto coverage areas 506. In this example, each of the femto coverage areas 506 (e.g., femto coverage area 506C) is depicted within a macro coverage area 504 (e.g., macro coverage area 504B). It should be appreciated, however, that a femto coverage area 506 may not lie entirely within a macro coverage area 504. In practice, a large number of femto coverage areas 506 can be defined with a given tracking area 502 or macro coverage area 504. Also, one or more pico coverage areas (not shown) can be defined within a given tracking area 502 or macro coverage area 504.

Referring again to FIG. 4, the owner of a femto node 410 can subscribe to mobile service, such as, for example, 3G mobile service, offered through the mobile operator core network 450. In another example, the femto node 410 can be operated by the mobile operator core network 450 to expand coverage of the wireless network. In addition, an access terminal 420 can be capable of operating both in macro environments and in smaller scale (e.g., residential) network environments. Thus, for example, depending on the current location of the access terminal 420, the access terminal 420 can be served by a macro cell access node 460 or by any one of a set of femto nodes 410 (e.g., the femto nodes 410A and 410B that reside within a corresponding user residence 430). For example, when a subscriber is outside his home, he is served by a standard macro cell access node (e.g., node 460) and when the subscriber is at home, he is served by a femto node (e.g., node 410A). Here, it should be appreciated that a femto node 410 can be backward compatible with existing access terminals 420.

A femto node 410 can be deployed on a single frequency or, in the alternative, on multiple frequencies. Depending on the particular configuration, the single frequency or one or more of the multiple frequencies can overlap with one or more frequencies used by a macro cell access node (e.g., node 460). In some aspects, an access terminal 420 can be configured to connect to a preferred femto node (e.g., the home femto node of the access terminal 420) whenever such connectivity is possible. For example, whenever the access terminal 420 is within the user's residence 430, it can communicate with the home femto node 410.

In some aspects, if the access terminal 420 operates within the mobile operator core network 450 but is not residing on its most preferred network (e.g., as defined in a preferred roaming list), the access terminal 420 can continue to search for the most preferred network (e.g., femto node 410) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 420 can limit the search for specific band and channel. For example, the search for the most preferred system can be repeated periodically. Upon discovery of a preferred femto node, such as femto node 410, the access terminal 420 selects the femto node 410 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 410 that reside within the corresponding user residence 430). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

As described further herein, low power base stations, such as femto nodes, can configure mobility or paging parameters based on observations of neighboring access points. In this regard, the low power base stations can, in effect, cause mobile devices to handover to the low power base station or to instead handover to other access points in some locations based on the observations. For example, a low power base station can determine capabilities of the neighboring access points based on one or more measured or otherwise received parameters. In addition, the neighboring access points can use broadcast signals and related parameters to indicate capabilities, which the low power base station can receive and use to adjust mobility or paging parameters. In one example, the low power base station can compare the capabilities to those of the low power base station in configuring the mobility or paging parameters. Where a neighboring access point has better capabilities than the low power base station, for example, the low power base station can set mobility or paging parameters in an attempt to effectively expand a serving area of the neighboring access point, and thus cause more mobile devices to be served by the neighboring access point rather than the low power base station.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

Figure 6:
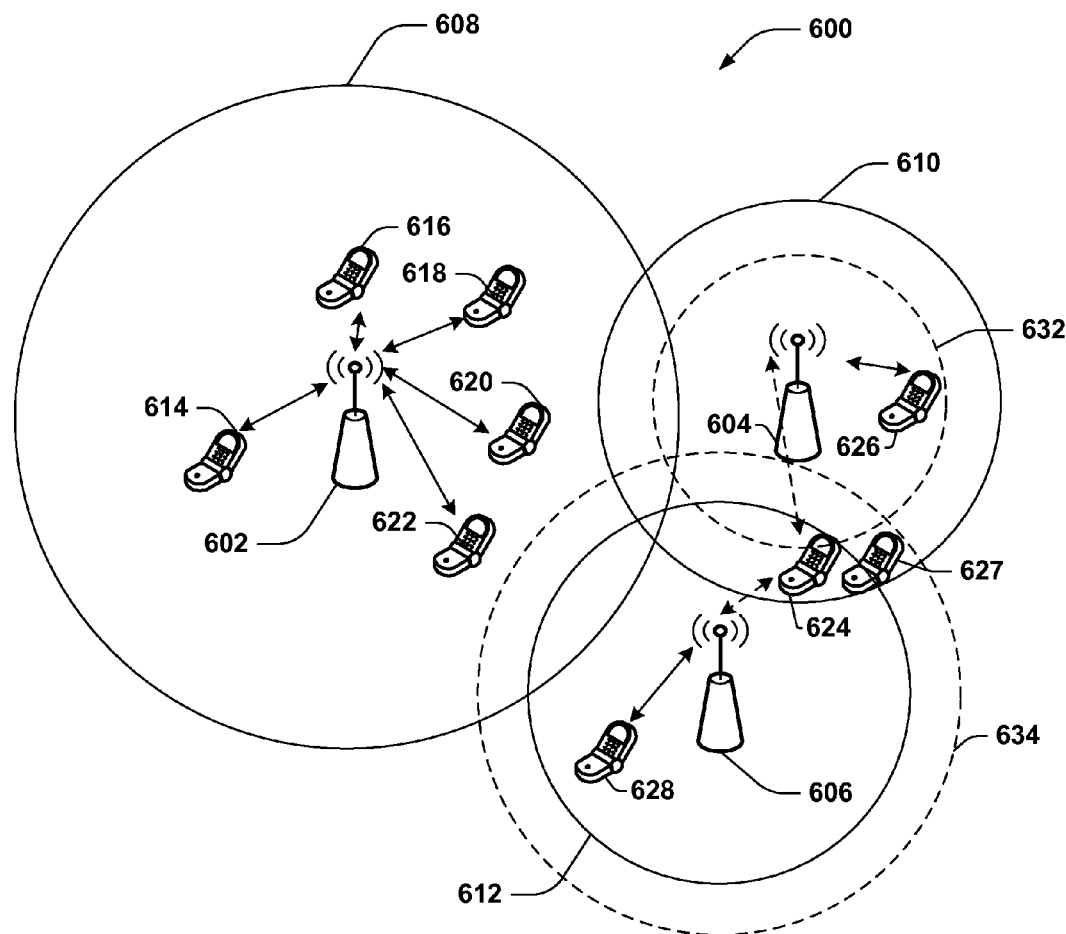
FIG. 6 is a block diagram of an example system that facilitates adjusting mobility or paging parameters of a femto node.

Referring to FIG. 6, an example wireless communication system 600 that facilitates adjusting mobility or paging parameters of a femto node. System 600 comprises a macro node 602, which can be a macro base station, or alternatively in another example, node 602 can be a femto, pico, or other low power base station. System 600 includes femto nodes 604 and 606, which can be substantially any type of low power base station. The nodes 602, 604, and 606 provide respective serving areas 608, 610, and 612. System 600 includes mobile devices 614, 616, 618, 620, 622, 624, 626, 627, and 628 that communicate with the nodes 602, 604, or 606 to receive wireless network access.

As described, the femto nodes 604 and 606 can communicate with the wireless network (not shown), e.g., over a broadband connection. In addition, femto nodes 604 and 606 can communicate with one another, and/or with macro node 602, over a wireless connection or over a backhaul connection. For example, the backhaul connection can be a connection managed through the core wireless network accessible over the broadband connection at the femto node 604 and/or 606 and/or over a connection through a radio network controller (RNC) that communicates with macro node 602. In another example, the backhaul connection can be a direct connection between any two nodes (e.g., femto node 604, 606 and/or macro node 602) over the broadband connection (e.g., X2, or Iur, or Iur-h interface). For example, upon initialization, one or more of the femto nodes 604 and/or 606 can also communicate with one another to form a grouping (e.g., an ad-hoc network). This allows the femto nodes 604 and/or 606 to communicate to determine parameters related to serving the various mobile devices connected thereto (e.g., resource allocations, interference management, and/or the like), in one example. Moreover, femto nodes 604 and 606 can automatically configure themselves to operate in the wireless network (e.g., set transmit power, network identifiers, pilot signal resources, and/or the like based on similar information received over a backhaul connection, over-the-air, or otherwise sensed from surrounding nodes). In this example, the femto nodes 604 and 606 can behave as plug-and-play devices requiring little user interaction to be provisioned on the wireless network.

In one example, femto node 604 can observe capabilities of macro node 602 and/or femto node 606 in determining parameters for providing wireless network access. For example, femto node 604 can determine or adjust mobility parameters (such as Qoffset, cell individual offset (CIO), hysteresis (Hyst), Qhyst, time to trigger (TTT), hierarchical cell structure (HCS), etc.), paging parameters (such as location area code (LAC), routing area code (RAC), tracking area code (TAC), paging signal power, offset, etc.), and/or the like, based on determined capabilities of macro node 602, femto node 606, etc. Qoffset can relate to a bias that a mobile device applies to a neighbor cell when comparing the quality of the neighbor with that of a current serving cell for the purpose of cell reselection. Qhyst can relate to a bias that a mobile device applies to the current serving cell when comparing the quality of the neighbor with that of a current serving cell for the purpose of cell reselection. TTT can relate to the minimum time duration needed for a condition to be satisfied before the mobile device triggers an event reporting to the serving base station. HCS can relate to prioritizing certain cells over the other cells for search and reselection purposes such that mobile devices perform searches for higher priority cells, irrespective of the channel conditions of the serving cell; thus, for cell reselections, the cells with higher priority are preferred by the mobile device in low mobility state and the cells with lower priority are preferred by the mobile device in high mobility state. For example, where capabilities of macro node 602, femto node 606, or other nodes are an improvement of at least a threshold over those of femto node 604, femto node 604 can adjust mobility parameters or paging parameters to defer more mobile devices to the other nodes. In another example, where capabilities of femto node 604 are an improvement of at least a threshold over those of macro node 602, femto node 606, or other nodes, then femto node 604 can adjust mobility parameters or paging parameters to attract more mobile devices to femto node 604. This can improve service for the mobile devices by allowing communication with the better suited access point.

For example, where femto node 604 determines capabilities of femto node 606 are better than those of femto node 604 and femto node 604 provides serving area 610, then adjusting mobility parameters generic to target femto nodes based on measured capabilities of femto node 606 allows femto node 604 to effectively shrink its serving area to serving area 632. Such parameters can include hysteresis parameters (e.g., Qhyst, Hyst, etc.), which can correspond to a value added to a target femto node for reselection to ensure a mobile device does not ping-pong between the target femto node and the source femto node. Decreasing such parameters can cause mobile device 624 to reselect to femto node 606 sooner. In another example, femto node 604 can adjust mobility parameters specific to a target femto node, such as femto node 606. Such parameters can include Qoffset or CIO, which can correspond to required offsets between a signal power of femto node 604 and a specific target femto node before a mobile device can handover from femto node 604 to the specific target femto node. Modifying such target-specific parameters, for example, effectively change serving area of the target femto node to cause reselection of one or more mobile devices. For example, femto node 604, upon determining that femto node 606 has improved capabilities, can raise a Qoffset or CIO for femto node 606, causing mobile device 624 to handover to femto node 606 sooner to take advantage of the improved capabilities. In another example (not illustrated), where femto node 604 determines that the femto node's 604 own capabilities are better than femto node 606, adjusting mobility parameters generic and/or specific to target femto nodes based on measured capabilities of femto node 606 allows femto node 604 to effectively enlarge its serving area (not shown).

In yet another example, femto node 606 can observe capabilities of macro node 602 and/or femto node 604 in determining parameters for providing wireless network access. For example, where femto node 606 determines capabilities of femto node 606 are better than those of femto node 604 and femto node 606 provides coverage area 612, then adjusting mobility parameters generic to target femto nodes based on measured capabilities of femto node 604 may allow femto node 606 to effectively enlarge its serving area to serving area 634. The adjustments of the mobility or paging parameters by femto node 606 may be in addition to or in alternative to adjustments by femto node 604. Such parameters can include hysteresis parameters (e.g., Qhyst, Hyst, etc.), which can correspond to a value added to a source femto node for reselection to ensure a mobile device does not ping-pong between the target femto node and the source femto node. Increasing such parameters can cause mobile device 627 to stay on femto node 606 longer. In another example, femto node 606 can adjust mobility parameters specific to a target femto node, such as femto node 604. Such parameters can include Qoffset or CIO, which can correspond to required offsets between a signal power of femto node 606 and a specific target femto node before a mobile device can handover from femto node 604 to the specific target femto node. Modifying such target-specific parameters, for example, effectively shrinks a serving area of the target femto node to cause reselection of one or more mobile devices. For example, femto node 606, upon determining that femto node 604 has lower capabilities, can lower a Qoffset or CIO for femto node 604, causing mobile device 627 to delay handover to femto node 604 to take advantage of the improved capabilities of femto node 606. In another example (not illustrated), where femto node 606 determines that the femto node's 606 own capabilities are worse than femto node 604, adjusting mobility parameters generic and/or specific to target femto nodes based on measured capabilities of femto node 604 allows femto node 606 to effectively shrink its serving area (not shown).

In obtaining capability information, for example, femto node 604 can determine a number of channel elements (CE), backhaul capacity, maximum transmission power, average downlink/uplink load, access mode, etc. of macro node 602 or femto node 606. This information can be obtained from the macro node 602 or femto node 606 in broadcast channel (BCH) messages, or can be embedded at the physical layer (e.g., in a pilot channel). In other examples, the macro node 602 and/or femto node 606 can utilize other information to indicate information, such as selecting a physical layer attribute (e.g., primary scrambling code (PSC)). In this example, the attribute can correspond to a subset of attribute values related to low capability or another subset related to high capability. Thus, femto node 606 can select an attribute to indicate the desired capability. Femto node 604 can measure broadcast parameters to determine capabilities of macro node 602 and/or femto node 606 (e.g., using a network listening module (NLM) or otherwise receiving capability parameters measured by a mobile device communicating with femto node 604). In the PSC example above, the femto node 604 can use the mapping to determine the capability information based on the PSC. In another example, macro node 602 and/or femto node 606 can communicate capability information to femto node 604 via a backhaul connection, as described.

Femto node 604 can compare the observed capability information to its own capabilities, in one example, to determine an adjustment of mobility parameters or paging parameters. For example, where femto node 604 determines femto node 606 has more CEs, femto node 604 can effectively reduce its serving area or increase serving area of the femto node 606 by modifying mobility parameters, as described above. This can make reselection to femto node 606 more likely. It is to be appreciated that femto node 604 can compare multiple measured or otherwise received capabilities of macro node 602 and/or femto node 606 in determining adjustment of mobility parameters. Moreover, it is to be appreciated that a centralized entity can collect capability information of multiple nodes and accordingly specify mobility parameters or paging parameters or related adjustments to the nodes based on capabilities. The nodes can set the mobility or paging parameters based on the received parameters or related adjustments received from the centralized entity. Moreover, femto node 604 can similarly adjust radio frequency (RF) parameters based on the measured capabilities.

In one example, femto nodes 604 and 606 can operate in an open or hybrid access mode to offload mobile devices from macro node 602. In this example, allowing the femto nodes to specify mobility or paging parameters to effectively define serving areas based on measured capabilities of other nodes provides a self-configuration ability from which the above scenario can benefit. In this regard, mobile devices offloaded from macro node 602 can be directed to femto nodes that provide the best or at least reasonable communication capabilities for the mobile device. In some examples, however, it is to be appreciated that femto nodes operating in a hybrid access mode can prefer member mobile devices to non-member mobile devices.

In addition, parameters can be updated by certain events, such as addition of femto nodes to the network, removal of femto nodes from the network, etc. For example, femto node 604 can detect a new femto node nearby (e.g., based on parameters received by the NLM) that provides improved capabilities, and can further modify mobility or paging parameters to facilitate handover of some mobile devices to the new femto node.

Figure 7:
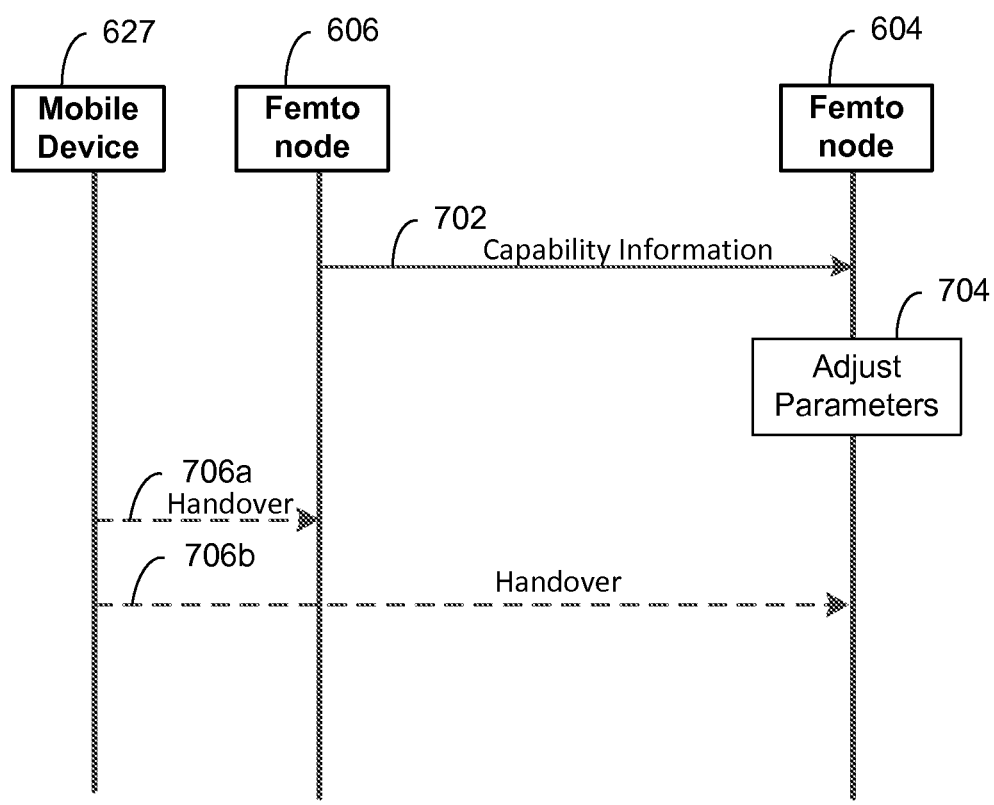
FIG. 7 is a sequence diagram of an example system for adjusting mobility or paging parameters of a femto node.

FIG. 7 is a sequence diagram of an example system adjusting mobility or paging parameters of a femto node. In the example illustrated in FIG. 7, the femto node 604 may receive capabilities information of femto node 606 at step 702. For example, the capabilities information may be broadcast by femto node 606 using the BCH or may be embedded at the physical layer (e.g., using the secondary synchronization channel). Additionally or alternatively, femto node 606 may use certain PSCs to signal low or high capabilities. Femto node 604 may receive the capabilities via the NLM or by using measurement reports from mobile devices to decode the capabilities information from the broadcast. Additionally or alternatively, the capabilities information may be communicated via a backhaul. Femto node 604 may adjust mobility or paging parameters based on the capabilities information received from femto node 606. If the femto node determines the capabilities of femto node 606 are better than those of femto node 604, femto node 604 may adjust mobility parameters to effectively shrink its serving area at step 704. The adjusted mobility parameters may bias handover of mobile devices away from femto node 604. In the example of FIG. 7, when mobile device 627 is connected to femto node 604, the mobile device 627 may handover to femto node 606 based on the adjusted mobility parameters of femto node 604 at step 706a.

If the femto node 604 determines the capabilities of femto node 606 are worse than those of femto node 604, femto node 604 may adjust mobility parameters to enlarge its serving area at step 704. The adjusted mobility parameters may bias handover of mobile devices toward femto node 604. In the example of FIG. 7, when mobile device 627 is connected to femto node 606, the mobile device 627 may handover to femto node 604 based on the adjusted mobility parameters of femto node 604 at step 706b.

Figure 8:
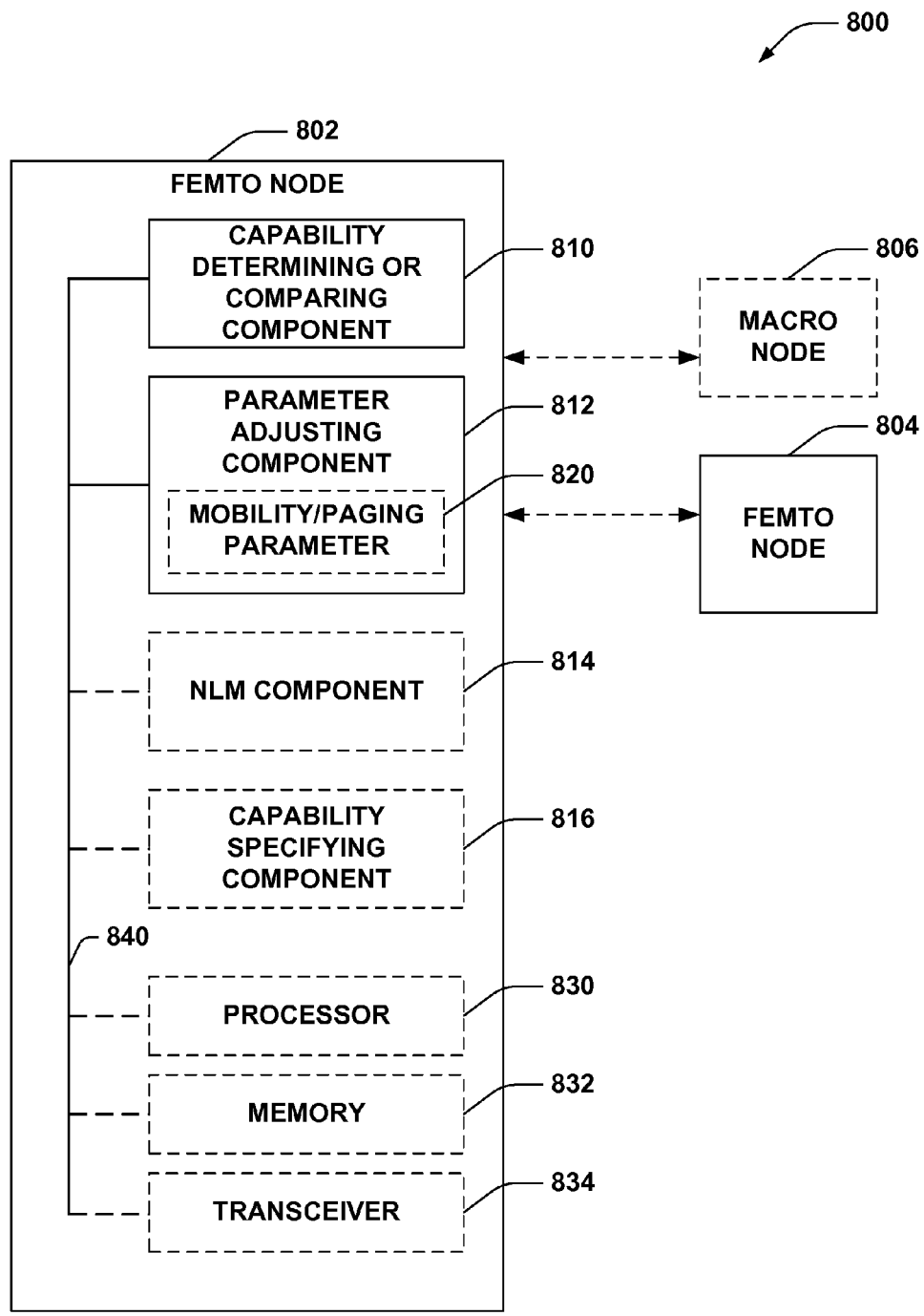
FIG. 8 is a block diagram of an example system that facilitates comparing capabilities of access points to determine mobility or paging parameters for a femto node.

FIG. 8 illustrates an example system 800 for adjusting mobility or paging parameters of a femto node. System 800 comprises a femto node 802 that can provide wireless network access to one or more mobile devices, as described, as well as a femto node 804 that is near femto node 802. Thus, for example, femto node 802 can be similar to one of femto nodes 604 or 606, and femto node 804 can be similar to another one of femto nodes 604 or 606. In this example, femto nodes 802 and 804 can communicate over a backhaul or optionally through a management server or gateway (e.g., H(e)NB management server (HMS) or H(e)NB gateway (HGW)) to manage parameters related to providing network access to the mobile devices. Moreover, an optional macro node 806 is provided. Macro node 806 can be similar to macro node 602, in one example.

It is to be appreciated that femto node 802 is represented as including functional blocks or components, which can be functional blocks or components that represent functions implemented by a processor, software, or combination thereof (e.g., firmware). Femto node 802 can include a capability determining or comparing component 810 for observing one or more parameters related to capabilities of another access point, and a parameter adjusting component 812 for adjusting one or more mobility or paging parameters based in part on the observed capabilities of other access points. The capability determining or comparing component 810 can be, or can include, means for determining and comparing capabilities. Said means can include an algorithm executed by one or more processors. The algorithm can include, for example, one or more of algorithms 902 or 904 described below in connection with FIG. 9. The parameter adjusting component 812 can be, or can include, means for adjusting one or more mobility or paging parameters. Said means can include an algorithm executed by one or more processors. The algorithm can include, for example, algorithm 906 described below in connection with FIG. 9.

Femto node 802 also optionally includes a NLM component 814 for obtaining one or more parameters broadcasted by the access points, and/or a capability specifying component 816 for communicating parameters regarding capabilities of femto node 802 to other access points.

According to an example, femto node 802 can determine mobility or paging parameters for communicating in a network given capabilities of femto node 804, macro node 806, or other nodes. This can occur upon initialization of femto node 802 in the wireless network, upon occurrence of one or more detected events—such as addition or removal of an access point in a wireless network, detected load at femto node 802 over a threshold, etc. —based on a timer or command from a core network component, and/or the like. In this example, capability determining or comparing component 810 can receive or otherwise determine one or more parameters related to capabilities at femto node 804. This can include capability determining or comparing component 810 receiving broadcast parameters from the femto node 804 (e.g., based on decoding signals received therefrom using NLM component 814), receiving parameters over a backhaul connection thereto, receiving parameters from a mobile device communicating with femto node 802 that can receive and/or measure parameters from femto node 804, etc.

The parameters broadcast by femto node 804 or otherwise determined based on information broadcast by femto node 804 can include a number of CEs, backhaul capacity and cost, maximum transmission power, average downlink/uplink load, access mode (open, hybrid, or closed), etc. In one example, this information can be broadcast by the femto node 804 (e.g., over a BCH or can be embedded at the physical layer, such as by using the secondary synchronization channel). Thus, NLM component 814, for instance, can receive the BCH, and capability determining or comparing component 810 can determine the information based on the parameters (e.g., as indicated or otherwise discerned from the parameters). In other examples, mobile devices communicating with femto node 802 can communicate measurement reports to femto node 802 that include parameters of femto node 804 from which capabilities can be determined. Alternatively, femto node 804 can utilize certain physical layer attributes, such as PSCs, to signal capabilities (e.g., low or high maximum transmission power, low or high resource capacity or utilization, etc.), where the physical layer attributes correspond to a range of attribute values indicative of capability information. In this example, the physical layer attributes are received at femto node 802, and capability determining or comparing component 810 compares the physical layer attributes to ranges of attribute values that relate to capability information. Based on the comparison, capability determining or comparing component 810 can determine capability information related to femto node 804. In other examples, femto node 804 can communicate the capability information to femto node 802 over a backhaul connection.

In any case, capability determining or comparing component 810 can interpret received information to determine capabilities of femto node 804. In a specific example, capability determining or comparing component 810 can obtain received pilot strength over total received signal power (Ecp/Io) of femto node 804, and can estimate average downlink load at femto node 804 based thereon (e.g., higher Ecp/Io can indicate lower downlink load, etc.). In this example, femto node 802 can receive the Ecp/Io using NLM component 814 or in measurement reports from mobile device. In another example, capability determining or comparing component 810 can estimate the average uplink load at femto node 804 in part by decoding an uplink interference level broadcast by femto node 804 (e.g., higher uplink interference can indicate higher uplink load, etc.). It is to be appreciated that capability determining or comparing component 810 can observe additional or alternative parameters, and can compare the parameters to those of femto node 802.

Parameter adjusting component 812 can adjust mobility or paging parameters of femto node 802, such as mobility/paging parameter 820, based on the comparison of capabilities of femto node 804 to those of femto node 802. For example, once femto node 802 becomes aware of the capabilities of femto node 804 (e.g., and/or macro node 806 or other neighboring nodes), capability determining or comparing component 810 can compare the capabilities of the femto node (and/or other access points) with its own capabilities, and parameter adjusting component 812 can adjust mobility/paging parameters 820 of femto node 802 (and/or related to mobility to a target femto node, such as femto node 806) to try to maximize the user experience at one or more mobile devices. The parameters can include, for example, Qoffset, CIO, Hyst, Qhyst, TTT, HCS, LAC, RAC, TAC, and/or the like.

For example, where one or more neighboring access points, such as femto node 804, have improved capabilities over femto node 802 as determined by capability determining or comparing component 810 (e.g., more CEs, better backhaul throughput, lower average load, operation in an open mode where femto node 802 operates in a hybrid mode, etc.), the parameter adjusting component 812 can bias mobility parameters to femto node 804, such as Qoffset, CIO, etc., such that mobile devices are more likely to handover to femto node 804 rather than stay on femto node 802. In another example, parameter adjusting component 812 can decrease hysteresis parameters at femto node 802 to bias handover toward femto node 804 or any target femto node. Thus, more mobile devices can reselect to the femto node 804 based on the improved capabilities. For example, where parameter adjusting component 812 reduces transmission power, serving area of the femto node 802 is effectively reduced, thus making it more likely for mobile devices to reselect or handover to a neighboring access point, such as femto node 804. Similarly, where femto node 802 has improved capabilities over other access points, parameter adjusting component 812 can increase a hysteresis or offset, and/or the like, to bias mobility towards femto node 802.

As another example, femto node 802 can modify paging parameters based on the capability comparison. For example, where capability determining or comparing component 810 determines a capability for handing a paging load is greater than a threshold for femto node 804 parameter adjusting component 812 can adjust a LAC, RAC, TAC, etc. to that of femto node 804. In this example, the femto node 804 can handle paging load related to mobile devices communicating with femto node 802.

In addition, for example, capability specifying component 816 can communicate capability information related to femto node 802 to other access points. For example, capability specifying component 816 can broadcast capabilities in one or more overhead messages. In one example, this can include explicit indication of capabilities, indication using one or more other parameters, such as PSC to indicate information based on comparing the PSC to one or more ranges of PSC values as described, etc. In another example, capability specifying component 816 can communicate the information over a backhaul to one or more access points, such as femto node 804, macro node 806, etc.

Moreover, it is to be appreciated that femto node 802 can be a centralized entity, such as a HNB gateway, HMS, etc. that collects or otherwise determines capability information of various femto nodes as described. In this example, parameter adjusting component 812 can adjust mobility or paging parameters for the various femto nodes and communicate the adjusted mobility or paging parameters to the femto nodes. The femto nodes can receive the mobility or paging parameters and accordingly adjust mobility or paging parameters based on those received.

Additionally, femto node 802 can include a memory 832 that retains instructions for executing functions associated with the components 810-820. While shown as being external to memory 832, it is to be understood that one or more of the components 810-820 can exist within memory 832. In one example, components 810-820 can comprise at least one processor, or each component 810-820 can be a corresponding module of at least one processor. Moreover, in an additional or alternative example, components 810-820 can be a computer program product comprising a computer readable medium, where each component 810-820 can be corresponding code.

In related aspects, the femto node 802 can optionally include a processor component 830 having at least one processor. The processor 830, in such case, can be in operative communication with the components 810-820 via a bus 840 or similar communication coupling. The processor 830 can effect initiation and scheduling of the processes or functions performed by components 810-820.

In further related aspects, the femto node 802 can include a radio transceiver component 834. A stand-alone receiver and/or stand-alone transmitter can be used in lieu of or in conjunction with the transceiver component 834. The femto node 802 can also include a network interface (not shown) for connecting to one or more network entities, such as macro node 806 or femto node 804.

Figure 9:
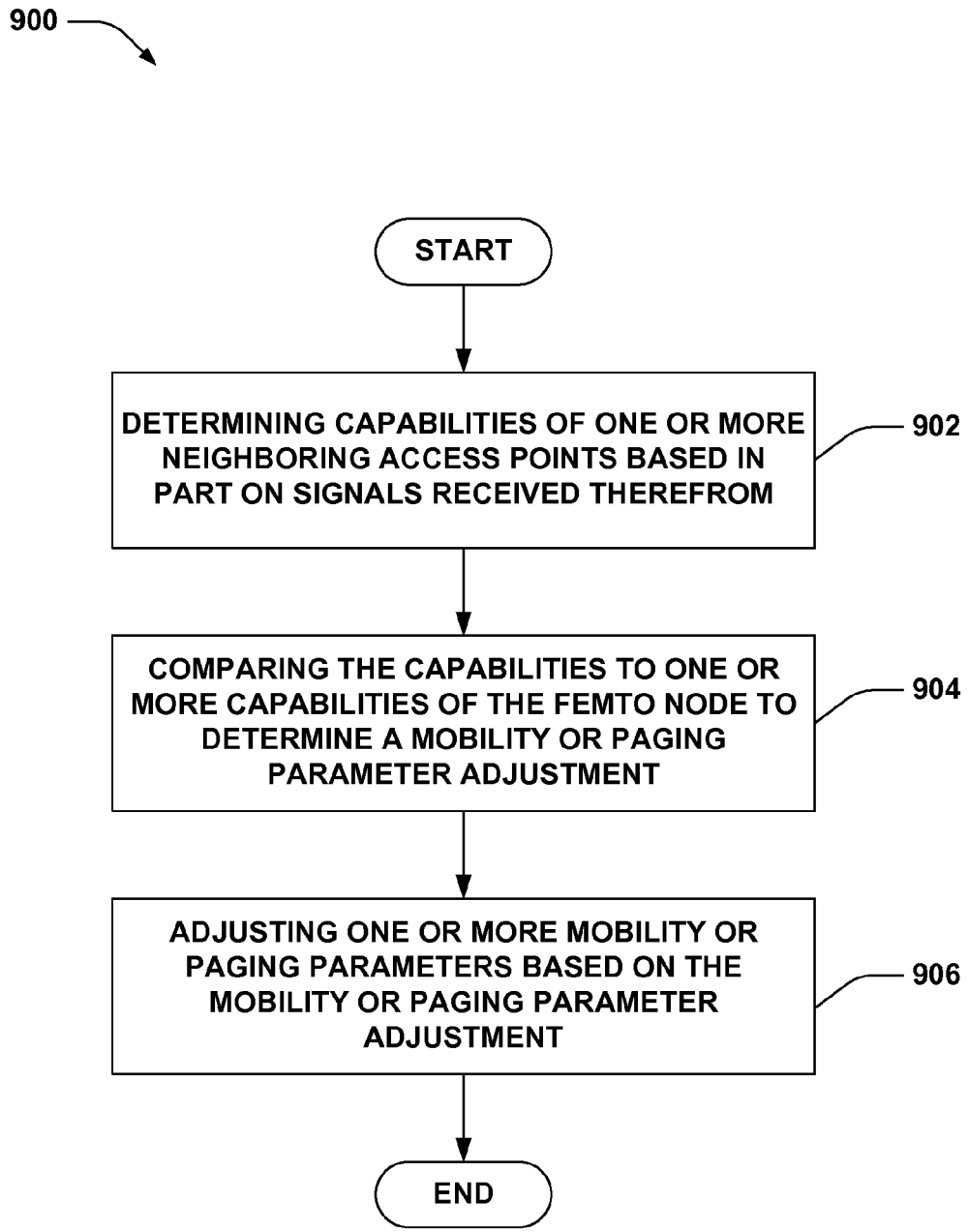
FIG. 9 is a flow chart of an aspect of an example methodology for adjusting mobility or paging parameters of a femto node.

Referring to FIG. 9, an example methodology relating to adjusting mobility or paging parameters of femto nodes to set a serving area is illustrated. While, for purposes of simplicity of explanation, methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 9, an example methodology 900 is illustrated that facilitates adjusting mobility or paging parameters of a femto node.

At 902, capabilities of one or more neighboring access points can be determined based in part on signals received therefrom. For example, the capabilities can relate to a number of channel elements, a backhaul capacity or cost, a maximum transmission power, an average downlink or uplink load, or an access mode of the one or more neighboring access points as received in a broadcast message from the one or more neighboring access points, and/or the like. Moreover, the determining can comprise receiving information regarding the capabilities over a BCH or backhaul connection, determining the capabilities based on information received over the BCH, inferring capabilities based on mapping one or more received physical layer attributes, such as a PSC, to possible capability parameters, and/or the like.

At 904, the capabilities can be compared to one or more capabilities of the femto node to determine a mobility or paging parameter adjustment for the femto node. For example, this can include determining whether the capabilities are better or worse than those determined for the one or more neighboring access points. Where the capabilities are better for the one or more neighboring access points, for example, the mobility or paging parameter adjustment can relate to decreasing a Qoffset or CIO related to the one or more neighboring access points and/or a hysteresis related to performing mobility. This can bias mobility toward the one or more neighboring access points, providing mobile devices with improved user experience based on the difference in capabilities. In another example, where the capabilities are better than a threshold for one or more neighboring access points, for example, if the femto node uses a different LAC, RAC, TAC, etc., the LAC, RAC, TAC, etc. can be modified to that of the neighboring access points, as the neighbor access point can handle paging load related to mobile devices communicating with the femto node. It is to be appreciated that where capabilities of the femto node are improved over, or at least within a threshold difference of, the neighboring access points, the Qoffset, CIO, hysteresis, etc. can be increased, and/or a LAC, RAC, TAC, etc. can be modified to match a macro node.

At 906, one or more mobility or paging parameters can be adjusted based on the mobility or paging parameter adjustment, as described. For example, the mobility or paging parameter adjustment can be absolute or relative to current values for the one or more mobility or paging parameters. The mobility or paging parameter can be adjusted at the femto node to effectuate modification of the serving area.

Figure 10:
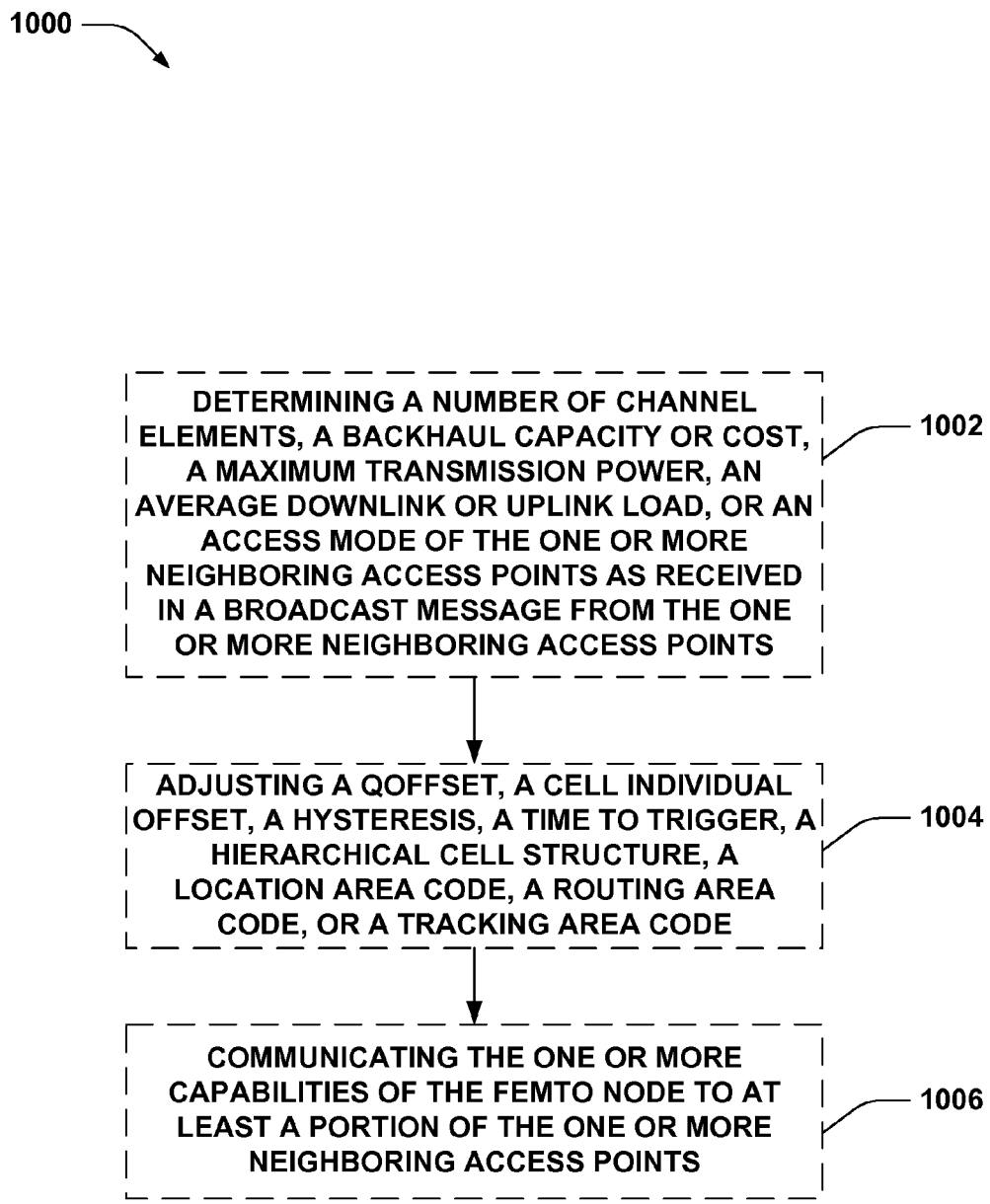
FIG. 10 is a flow chart of additional aspects of an example methodology for adjusting mobility or paging parameters of a femto node.

With reference to FIG. 10, there are shown further operations 1000 or aspects of methodology 900 that are optional. If the method 1000 includes at least one block, then the method 1000 may terminate after the at least one block of method 1000, without necessarily having to include any subsequent downstream block(s) that may be illustrated. It is further noted that numbers of the blocks do not imply a particular order in which the blocks may be performed according to the method 1000. For example, the method 1000 may further include, at 1002, determining a number of channel elements, a backhaul capacity or cost, a maximum transmission power, an average downlink or uplink load, or an access mode of the one or more neighboring access points as received in a broadcast message from the one or more neighboring access points. For example, the method 1000 may further include, at 1004, adjusting a Qoffset, a cell individual offset, a hysteresis, a time to trigger, a hierarchical cell structure, a location area code, a routing area code, or a tracking area code. For example, the method 1000 may further include, at 1006, communicating the one or more capabilities of the femto node to at least a portion of the one or more neighboring access points.

It will be appreciated that, in accordance with one or more aspects described herein, inferences can be made regarding determining capabilities of neighboring access points, determining a corresponding mobility or paging parameter adjustment, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for configuring mobility or paging parameters of a femto node, comprising:
   determining capabilities of one or more neighboring access points based in part on signals received from the one or more neighboring access points;
   comparing the capabilities to one or more capabilities of the femto node to determine a mobility or paging parameter adjustment; and
   adjusting one or more mobility or paging parameters based on the mobility or paging parameter adjustment, wherein the adjusting comprises adjusting the one or more mobility or paging parameters of the femto node to bias handover toward the femto node if the one or more capabilities of the femto node exceed the capabilities of one or more neighboring access points by a first threshold value.

2. The method of claim 1, wherein the determining the capabilities comprises determining at least one or more of a number of channel elements; a backhaul capacity or cost; a maximum transmission power; an average downlink or uplink load; or an access mode of the one or more neighboring access points, the access mode of the one or more neighboring access points being received in a broadcast message from the one or more neighboring access points.

3. The method of claim 1, wherein the determining the capabilities is based in part on a physical layer attribute transmitted by the one or more neighboring access points.

4. The method of claim 1, wherein the one or more capabilities of the femto node do not change with a number of mobile entities served by the femto node.

5. The method of claim 1, wherein the determining the capabilities is based in part on one or more of a message received from the one or more neighboring access points over a backhaul connection therewith, a message received from the one or more neighboring access points over air, or a message received from a mobile device.

6. The method of claim 1, wherein the adjusting the one or more mobility or paging parameters comprises adjusting one or more of a Qoffset, a cell individual offset, a hysteresis, a time to trigger, a hierarchical cell structure, a location area code, a routing area code, or a tracking area code.

7. The method of claim 1, further comprising communicating the one or more capabilities of the femto node to at least a portion of the one or more neighboring access points.

8. The method of claim 1, wherein the adjusting comprises adjusting the one or more mobility or paging parameters of the femto node to bias handover away the femto node if the capabilities of one or more neighboring access points exceed the one or more capabilities of the femto node by a second threshold value.

9. An apparatus for configuring mobility or paging parameters of a femto node, comprising:
   at least one processor configured to:
      determine capabilities of one or more neighboring access points based in part on signals received from the one or more neighboring access points;
      compare the capabilities to one or more capabilities of the femto node to determine a mobility or paging parameter adjustment; and
      adjust one or more mobility or paging parameters based on the mobility or paging parameter adjustment, wherein the configuration of the at least one processor to adjust comprises configuration to adjust the one or more mobility or paging parameters of the femto node to bias handover toward the femto node if the one or more capabilities of the femto node exceed the capabilities of one or more neighboring access points by a first threshold value; and
   a memory coupled to the at least one processor.

10. The apparatus of claim 9, wherein the at least one processor determines the capabilities as one or more of a number of channel elements, a backhaul capacity or cost, a maximum transmission power, an average downlink or uplink load, or an access mode of the one or more neighboring access points, the access mode of the one or more neighboring access points being received in a broadcast message from the one or more neighboring access points.

11. The apparatus of claim 9, wherein the at least one processor determines the capabilities based in part on a physical layer attribute transmitted by the one or more neighboring access points.

12. The apparatus of claim 9, wherein the one or more capabilities of the femto node do not change with a number of mobile entities served by the femto node.

13. The apparatus of claim 9, wherein the at least one processor determines the capabilities based in part on one or more of: a message received from the one or more neighboring access points over a backhaul connection therewith, a message received from the one or more neighboring access points over air, or a message received from a mobile device.

14. The apparatus of claim 9, wherein the one or more mobility or paging parameters comprise one or more of a Qoffset, a cell individual offset, a hysteresis, a time to trigger, a hierarchical cell structure, a location area code, a routing area code, or a tracking area code.

15. The apparatus of claim 9, wherein the at least one processor is further configured to communicate the one or more capabilities of the femto node to at least a portion of the one or more neighboring access points.

16. The apparatus of claim 9, wherein the configuration of the at least one processor to adjust comprises configuration to adjust the one or more mobility or paging parameters of the femto node to bias handover away the femto node if the capabilities of one or more neighboring access points exceed the one or more capabilities of the femto node by a second threshold value.

17. An apparatus for configuring mobility or paging parameters of a femto node, comprising:
   means for determining capabilities of one or more neighboring access points based in part on signals received from the one or more neighboring access points;
   means for comparing the capabilities to one or more capabilities of the femto node to determine a mobility or paging parameter adjustment; and
   means for adjusting one or more mobility or paging parameters based on the mobility or paging parameter adjustment, wherein the means for adjusting comprises means for adjusting the one or more mobility or paging parameters of the femto node to bias handover toward the femto node if the one or more capabilities of the femto node exceed the capabilities of one or more neighboring access points by a first threshold value.

18. The apparatus of claim 17, wherein the means for determining determines the capabilities as one or more of a number of channel elements, a backhaul capacity or cost, a maximum transmission power, an average downlink or uplink load, or an access mode of the one or more neighboring access points, the access mode of the one or more neighboring access points being received in a broadcast message from the one or more neighboring access points.

19. The apparatus of claim 17, wherein the means for determining determines the capabilities based in part on a physical layer attribute transmitted by the one or more neighboring access points.

20. The apparatus of claim 17, wherein the one or more capabilities of the femto node do not change with a number of mobile entities served by the femto node.

21. The apparatus of claim 17, wherein the means for determining determines the capabilities based in part on one or more of a message received from the one or more neighboring access points over a backhaul connection therewith, a message received from the one or more neighboring access points over air, or a message received from a mobile device.

22. The apparatus of claim 17, wherein the one or more mobility or paging parameters comprise one or more of a Qoffset, a cell individual offset, a hysteresis, a time to trigger, a hierarchical cell structure, a location area code, a routing area code, or a tracking area code.

23. The apparatus of claim 17, further comprising means for communicating the one or more capabilities of the femto node to at least a portion of the one or more neighboring access points.

24. The apparatus of claim 17, wherein the means for adjusting comprises means for adjusting the one or more mobility or paging parameters of the femto node to bias handover away the femto node if the capabilities of one or more neighboring access points exceed the one or more capabilities of the femto node by a second threshold value.

25. A non-transitory computer-readable medium, comprising:
   code for causing at least one computer to determine capabilities of one or more neighboring access points based in part on signals received from the one or more neighboring access points;
   code for causing the at least one computer to compare the capabilities to one or more capabilities of a femto node to determine a mobility or paging parameter adjustment; and
   code for causing the at least one computer to adjust one or more mobility or paging parameters based on the mobility or paging parameter adjustment, wherein the code for causing the at least one computer to adjust comprises code for adjusting the one or more mobility or paging parameters of the femto node to bias handover toward the femto node if the one or more capabilities of the femto node exceed the capabilities of one or more neighboring access points by a first threshold value.

26. The non-transitory computer-readable medium of claim 25, wherein the code for causing the at least one computer to determine determines the capabilities as one or more of a number of channel elements, a backhaul capacity or cost, a maximum transmission power, an average downlink or uplink load, or an access mode of the one or more neighboring access points, the access mode of the one or more neighboring access points being received in a broadcast message from the one or more neighboring access points.

27. The non-transitory computer-readable medium of claim 25, wherein the code for causing the at least one computer to determine determines the capabilities based in part on a physical layer attribute transmitted by the one or more neighboring access points.

28. The non-transitory computer-readable medium of claim 25, wherein the one or more capabilities of the femto node do not change with a number of mobile entities served by the femto node.

29. The non-transitory computer-readable medium of claim 25, wherein the code for causing the at least one computer to determine determines the capabilities based in part on one or more of a message received from the one or more neighboring access points over a backhaul connection therewith, a message received from the one or more neighboring access points over air, or a message received from a mobile device.

30. The non-transitory computer-readable medium of claim 25, wherein the one or more mobility or paging parameters comprise one or more of a Qoffset, a cell individual offset, a hysteresis, a time to trigger, a hierarchical cell structure, a location area code, a routing area code, or a tracking area code.

31. The non-transitory computer-readable medium of claim 25, wherein the computer-readable medium further comprises code for causing the at least one computer to communicate the one or more capabilities of the femto node to at least a portion of the one or more neighboring access points.

32. The non-transitory computer-readable medium of claim 25, wherein the code for causing the at least one computer to adjust comprises code for adjusting the one or more mobility or paging parameters of the femto node to bias handover away the femto node if the capabilities of one or more neighboring access points exceed the one or more capabilities of the femto node by a second threshold value.

* * * * *